United States Patent [19]

van Kuijk

[11] 4,213,563

[45] Jul. 22, 1980

[54] HEAT STORAGE AND TRANSMISSION APPARATUS FOR HEAT FROM A FLUID HEATED BY THE SUN

[75] Inventor: Josephus P. M. van Kuijk, Blonay, Switzerland

[73] Assignee: Patlico Rights N.V., Willematad, Netherlands Antilles

[21] Appl. No.: 923,315

[22] Filed: Jul. 10, 1978

[30] Foreign Application Priority Data

Jul. 15, 1977 [NL] Netherlands ................... 7707915

[51] Int. Cl.$^2$ ............................................. G05D 23/00
[52] U.S. Cl. ................................. 237/2 B; 126/419; 126/421; 126/436; 165/104 S; 60/641; 60/659; 62/238
[58] Field of Search ............... 165/104 S; 126/400, 126/436, 419, 421, 437; 237/1 A, 2 B; 62/238; 60/641, 659

[56] References Cited

U.S. PATENT DOCUMENTS

| | | | |
|---|---|---|---|
| 4,021,895 | 5/1977 | Morse et al. | 126/400 X |
| 4,054,124 | 10/1977 | Knoos | 126/421 |
| 4,055,055 | 10/1977 | Horowitz | 126/400 X |
| 4,119,143 | 10/1978 | Robinson, Jr. | 126/400 X |

*Primary Examiner*—Albert W. Davis
*Attorney, Agent, or Firm*—O'Brien & Marks

[57] ABSTRACT

An installation for storing and transmitting heat of a fluid heated by solar radiation, said installation being provided with a fluid tank and contained in said tank heat exchanging means for heat exchange between the heated fluid supplied through a pipe and the fluid in the tank. The heat exchanging means comprise at least two, preferably three, heat exchangers disposed in associated zones at ascending levels in the tank, corresponding to ascending temperature ranges of the fluid in the tank, and in each of said zones, for transmission of heat therefrom, spaced apart above the respective heat exchanger at least one further transmission heat exchanger for heat exchange between the fluid and water of the temperature associated with the respective temperature range. Thermometers are located in the fluid in each of the temperature ranges of the fluid in the tank on the other end are operatively connected to a valve control system for controlling the throughflow of the first heat exchangers through the fluid by controlling associated valves and a circulating pump in the fluid pipe.

5 Claims, 1 Drawing Figure

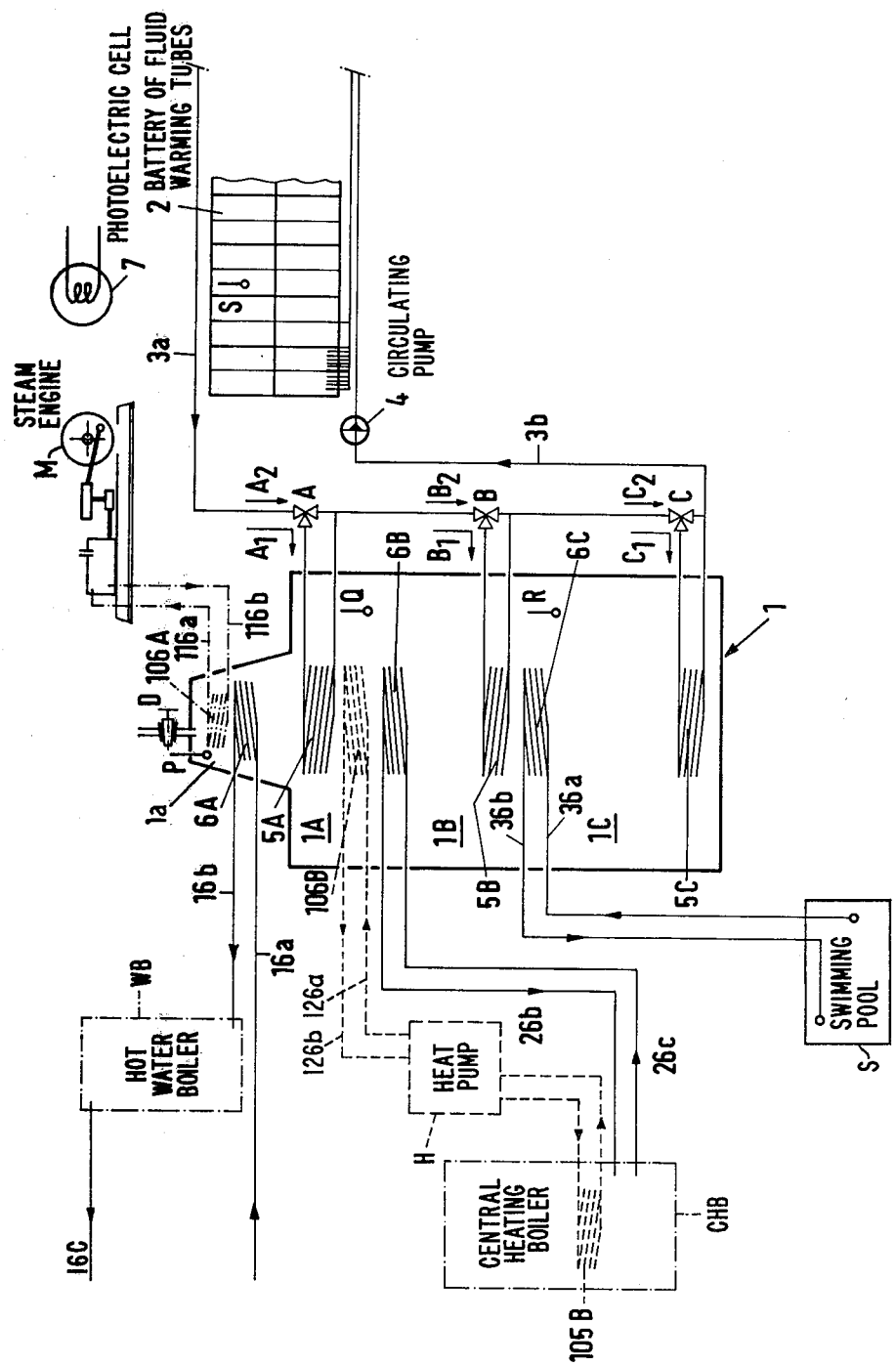

HEAT STORAGE AND TRANSMISSION APPARATUS FOR HEAT FROM A FLUID HEATED BY THE SUN

The present invention relates to an apparatus for storing and transmitting heat from a fluid heated by the sun, which apparatus is provided with a fluid tank containing means for heat exchange between the fluid supplied by a pipe and the fluid in the tank, and with means for transmitting the heat stored in the fluid for utilization purposes.

During the collection of solar heat there occurs the problem that the collected heat strongly varies both as to quantity and as to temperature level of the fluid directly irradiated by the sun.

Apparatuses of the above described type are known, wherein the fluid tank is a hot water tank which itself is incorporated in and itself forms part of a hot water system comprising control provisions which ensure distribution of the water in said system to parts having mutually different temperature ranges, in proportion to the temperature level in the storage tank. Therefore the fluid tank in these apparatuses is actually the so-called boiler of the hot water system and is traversed by the water from said system.

According to the invention, however, other steps are taken to achieve an increased heat output, use being made of the insight that, when fluid is not subjected in a heat storage tank to forced circulation, the temperatures prevailing at various levels of such a tank and increasing with height may be substantially maintained, without excessive mixing when it is ensured that the temperatures increasing with increasing height at the various levels are maintained as much as possible.

To this effect according to the invention an apparatus of the above described type is characterized by primary heat exchange means comprising at least two, preferably three, heat-exchangers disposed in associated ranges at increasing levels, corresponding to increasing temperature ranges of the fluid in the tank, while in each of said ranges there is provided, for transmission of heat therefrom, spaced apart above the respective heat exchangers at least one further transmission heat exchanger for the heat exchange between the fluid and water of the temperature associated with the respective temperature range, and thermometers in the fluid in each of the temperature ranges of the fluid in the tank being operatively connected to a valve control system for controlling the throughflow of the heat exchangers of the first group by controlling associated valves of a circulating pump in the fluid pipe.

The fluid tank thus contains in ascending levels each time at the bottom of the level in question, a heat exchanger exchanging the heat between the irradiated fluid and the fluid in the tank and at the top of said range a heat exchanger transmitting the heat from said range of the fluid in the tank to a water system. The valve control system ensures thereby that in proportion to the temperature level of the heat collected by the fluid in solar cells, the distribution of the fluid to the heat exchangers disposed in the various levels of the fluid tank is optimally controlled.

According to the invention the ascending temperature ranges may lie respectively below about 40°–50° C., between about 40°–50° C. and about 70°–80° C., and above about 70°–80° C.

If heat-storage and transmission from a fluid of a solar energy collection installation which very high temperatures can be attained in the fluid, roughly far above 100° C., it is possible according to another elaboration of the principle according to the invention, that the fluid tank is a closed, pressure-resistant tank containing in the upper region at least one further transmission heat exchanger forming part of a steam circuit which comprises a steam engine or the like unit. Thus, in such case, it will also be possible to drive a power engine by means of the collected solar heat, which may for instance be of special importance to keep the energy required for the control system to be supplied from outside as low as possible.

In case it concerns a larger installation, it is possible in a further elaboration of the principle according to the invention and for ensuring that at least one of the higher temperature ranges supplies comparatively more hot water of higher temperature, that the storage installation is of a more refined design in that at least one further transmission heat exchanger in the fluid tank is disposed at the top of one of the said temperature ranges of said tank, directly adjoining the higher temperature range, which further heat exchanger forms part of a fluid circuit comprising a heat pump and a heat exchanger for transmitting heat to the water system at a temperature level that is increased relative to the temperature of said fluid in the further heat exchanger, said water system being associated with the transmission heat exchanger of the respective temperature range of the fluid tank.

One embodiment according to the invention will now be explained by way of example, with reference to the diagrammatic drawing.

In the drawing there is generally indicated by numeral 1 a fluid tank which in the embodiment shown is of the closed type and having roughly a capacity of a few thousand liters. A dome-shaped upper portion 1a of tank 1 carries a valve D at its top. In the tank 1C, 1B and 1A indicate three levels in the fluid tank 1.

The tank is substantially filled with fluid. The fluid in the tank—constituting a fluid system of its own—should have a comparatively high specific heat. In addition to water, possibly with salts dissolved therein, also suitable known per se fluids will come into consideration, in which respect the cost aspect naturally plays a role.

The tank 1 is provided with a heat insulating lining, now shown, and, in the present case, resistant to internal over-pressure originating from vapour possibly produced at higher temperatures of the fluid in the tank, respectively resistant to steam pressure.

In the tank 5C, 5B and 5A show the respective primary heat exchangers, each time at the bottom of one of the levels 1C, 1B and 1A. In this sequence said levels have an ascending temperature.

The heat exchangers 5C, 5B and 5A form part of a pipe system 3a, 3b, conducting fluid heated by solar irradiation to said heat exchangers and, after heat exchange in said heat exchangers with the fluid in tank 1, returning same to a battery of fluid warming-up tubes indicated in general in the figure by reference numeral 2. This is formed in a known per se manner by a plurality of solar cells, so fluid tubes, each having associated reflection faces by means of which solar radiation is so reflected to said tubes as to heat the fluid in the tubes.

In the pipe system 3a, 3b there is furthermore incorporated a circulating pump 4. Furthermore the pipe system comprises valves A, B and C, which according to the drawing are three-way valves. By means of arrows $A_1$, $B_1$ and $C_1$ is each time indicated the flow direction of the respective valves A, B and C—in corresponding position—whereby from pipe 3a there is a direct branch connection to the respective heat exchangers 5A, 5B, 5C, and by arrows $A_2$, $B_2$ and $C_2$ the flow direction in the position of valves A, B and C, whereby the fluid originating from the fluid pipe section 3a is not branched to the heat exchangers 5A, 5B, 5C, but instead thereof flows further to the next valve, respectively to the return portion 3b of the fluid pipe, wherein the fluid returns to the battery 2.

The installation has the purpose that the heat supplied through the pipe 3a and stored in the fluid is transmitted as much as possible via said heat exchangers 5A, 5B and 5C to the fluid tank 1 at the respective levels 1A, 1B, 1C.

The temperature at said levels 1C, 1B and 1A of the fluid tank—in this order—lies substantially below 40°–50° C., between 40°–50° C. and 70°–80° C., and above 80° C.

At the levels 1A, 1B and 1C of the tank and in the battery 2 there are furthermore indicated thermometers 4, Q, R and S forming part of a control system to be explained in the following for controlling the valves A, B and C, as well as the operation of the circulating pump P.

At the same levels 1A, 1B and 1C there is furthermore disposed at the top a further heat exchanger 6A, 6B, 6C. As a result the heat stored in the fluid of the tank is to be transmitted each time to a water system of a specific temperature range. The respective heat exchangers 6A, 6B and 6C will be called, in the following, transmission heat exchangers.

The transmission heat exchanger 6A is traversed by water, which originates via a supply line 16a from the water supply system. The intention is that warming up of said water takes place to a temperature above a level of at least 70° C., so that via line 16b a water boiler WB can supply water of said high temperature for domestic use, for instance for the hot water piping, kitchen, bath, shower, etc., via the supply line 16c from said boiler.

The transmission heat exchanger 6B forms part of a water system operating in a temperature range of above approximately 40° to at most about 80° and which is destined for domestic, office or the like heating purposes, i.e. in general for a so-called central heating. The heating boiler for said central heating system is indicated by CHB.

The transmission heat exchanger 6C is incorporated in a water system destined for heating a swimming pool, via pipe 36b, 36a. The diagram shows the connections of the branches 36a and 36b to the swimming pools.

At the tank level 1B—in the present case the central level—there is disposed above the transmission heat exchanger 6B another transmission heat exchanger 106 B, forming part of an auxiliary fluid system shown in dash-lines, which is in heat exchanging communication with the above cited central heating boiler CHB by means of a heat exchanger 105 B forming part of the above fluid system. That system furthermore comprises a so-called heat pump indicated by H.

The object of said auxiliary system with heat pump H, pipes 126a, 126b and heat exchangers 106 B and 105 B, during the periods and in those cases that at the fluid tank level 1B a temperature level is reached that is insufficient for the central heating purposes, is to provide sufficient heat for said central heating installation, but sufficient fluid though at a lower temperature level than becomes available for the required temperature level in the central heating installation—in the heat pump—while yet contributing to a higher temperature level of the water in the central heating boiler.

There is no need to further discuss the known per se principle of such a heat pump, by means of which through the heat present in a relatively large quantity of fluid of comparatively low temperature level in a closed circuit, it is possible to bring a substantially smaller amount of fluid at a substantially higher temperature level. It naturally depends on the financial means available for the purchases of such an installation whether a refinement of such an auxiliary system will be employed or not.

At the top of the fluid tank 1, viz. above the transmission heat exchanger 6A for the boiler water system WB, 16a, 16b, there is present another transmission heat exchanger 106 A show by dash-dot lines. Via a pipe system having branches 116a and 116b, said heat exchanger 106A is connected to a steam engine M. This is a possibility that can be employed when the fluid temperature to be obtained in battery 2 comes substantially above 100° C., so that via the transmission heat exchanger 106 A steam can be supplied in such case to the steam engine M. The tank 1 should naturally be designed for the over-pressure prevailing in the interior as a result of the fluid in the tank heated to a high level, and, in so far as necessary, to be protected against such pressure.

The control diagram shown in the following will show the manner in which the control system for the fluid-throughflow of the fluid heated by the sun in the battery 2 ensures the distribution via pipe 3a by means of suitable positions for the valves A, B and C over the heat exchangers 5A, 5B and 5C.

For the operation of the above control system is furthermore of relevance a photoelectric cell incorporated therein and indicated by 7, which records the hours of direct solar radiation of the reflectors in the battery 2, or hours with no solar radiation or hours with very little solar radiation.

In the below indicated control diagram a distinction is made between on the one hand the situation—indicated by the photoelectric cell—of solar radiation, which period is indicated by the time of 8 hours to 15.30 hours, and on the other hand in substantially sunless periods, and the periods—in case of substantially cloudless sky—between about 15.30 hours in the afternoon until 8 hours the next day. After 15.30 hours the force of the solar radiation rapidly decreases: it will be useful then to proceed to collecting the radiation at a lower temperature which is faster attained and which produces less irridiation losses.

In the control diagram the letters P, Q, R and S do not only indicate the respective thermometers but likewise the temperatures indicated by said thermometers. For instances P<80° C. means that the thermometer P indicates a value that is lower than 80° C.

In addition to controlling the control valves A, B and C, the control system ensures the operation or disengagement of the circulating pump 4, according to the right-hand column and the one but rightmost column.

The positions for valves A, B and C, viz. $A_2$, $B_2$ and $C_1$ shown at the bottom of the one but leftmost column of the control diagram show in what situations the circulating pump 4 is or is not in operation: for instance the circulating pump is in operation when the fluid temperature measured in the battery at S is larger than R+10° C., but out of operation when said temperature measured by the thermometer S is lower than R+2° C.

CONTROL DIAGRAM

| Solar radiation period: | Photoelectric cell (7) 8 h.–15.30 h | Sunless periods and 15.30–8 h. | Fluid circulating pump (u) in operation | out of operation |
|---|---|---|---|---|
| P < 80° | A1-B2-C2 | — | S > P + 10° C. | S < P + 2° C. |
| P > 80° | A2-B1-C2 | — | S > Q + 10° C. | S < Q + 2° C. |
| Q > 55° | A2-B2-C1 | — | S > R + 10° C. | S < P + 2° C. |
|  | — | A2-B2-Cl | S > R + 10° C. | S < R + 2° C. |

It will be clear that the embodiment described in the above and schematically shown in the drawing is only one from the many possibilities according to the invention, and that all kinds of variants are possible in the scope of the present invention. In particular also the limits of the temperature ranges can be chosen deviating from the values indicated in the foregoing, and there may also be more different temperature ranges in proportion to the application possibilities that exist for water systems with varying temperatures.

The applications, as mentioned in the above respectively for boiler water, central heating water and swimming pool heating, are frequently employed possibilities and for these reasons the embodiment has been based thereon.

Furthermore, according to the above described embodiment, there is provided the possibility to apply fluid temperatures at the top of the tank substantially above the boiling temperature of water. When in such applications the storage fluid in the tank instead of water is a fluid of substantially higher boiling temperature, e.g. oil, it stands to reason that a non-pressure resistant storage tank will be sufficient.

I claim:

1. An installation for storage and transmission of heat of a fluid heated by solar radiation comprising
    a closed fluid tank,
    at least two primary heat exchange means in said fluid tank, each of said primary heat exchange means being located at ascending levels in said tank to define ascending temperature zones therein,
    a pipe system operatively connected to said primary heat exchange means,
    a circulation pump in said pipe system for circulating solar heated fluid to and from said primary heat exchange means,
    transmission heat exchange means spaced above each primary heat exchange means in each zone in said tank,
    said transmission heat exchange means being adapted to transmit heat from the closed fluid tank for utilization purposes,
    thermometers in each of said temperature zones, and
    a valve control system operatively connected to said thermometers for controlling the throughflow of the primary heat exchange means in accordance with temperature variations in the closed fluid tank.

2. The invention according to claim 1 characterized in that the fluid tank is a pressure resistant tank having in its upper region at least one other transmission heat exchange means forming part of a steam circuit for a steam operated apparatus.

3. The invention according to claim 1 characterized in that there are three ascending temperature zones which lie respectively below about 40°–50° C., between about 40°–50° C. and about 70°–80° C., and about 70°–80° C.

4. The invention according to claim 3 characterized in that the fluid tank is a pressure resistant tank having in its upper region at least one other transmission heat exchange means forming part of a steam circuit for a steam operated apparatus.

5. The invention according to claim 1, 2, 3 or 4 characterized in that at least one further transmission heat exchange means is disposed in said fluid tank at the top of one of said temperature zones therein adjacent the next temperature zone, which further transmission heat exchange means forms part of a fluid circuit having a heat pump, and an additional transmission heat exchange means is disposed in said fluid tank at another temperature zone therein, which additional transmission heat exchange means is disposed in fluid circuit having a hot water system.

* * * * *